US008447158B2

(12) United States Patent
Yamamoto (10) Patent No.: US 8,447,158 B2
(45) Date of Patent: May 21, 2013

(54) REPEATER DEVICE

(75) Inventor: Yuji Yamamoto, Osaka (JP)

(73) Assignee: Onkyo Corporation, Neyagawa-shi (JP)

( * ) Notice: Subject to any disclaimer, the term of this patent is extended or adjusted under 35 U.S.C. 154(b) by 0 days.

(21) Appl. No.: 13/352,416

(22) Filed: Jan. 18, 2012

(65) Prior Publication Data

US 2013/0101265 A1   Apr. 25, 2013

(30) Foreign Application Priority Data

Oct. 20, 2011   (JP) .................................. 2011-230217

(51) Int. Cl.
*H04N 5/765*   (2006.01)
*G06F 1/24*   (2006.01)
*G06F 9/00*   (2006.01)
*H04L 9/32*   (2006.01)

(52) U.S. Cl.
USPC ............ 386/200; 713/100; 713/168; 713/169

(58) Field of Classification Search
USPC .................. 386/200–234, 239–262; 713/100, 713/150–181; 726/1–36
See application file for complete search history.

(56) References Cited

U.S. PATENT DOCUMENTS

| 6,956,949 | B1 * | 10/2005 | Faber et al. .................... 380/200 |
| 7,287,282 | B2 * | 10/2007 | Yamada et al. .................. 726/26 |
| 8,045,552 | B2 * | 10/2011 | Unger ............................ 370/389 |
| 8,259,949 | B2 * | 9/2012 | Devanand et al. ............. 380/278 |
| 8,375,150 | B2 * | 2/2013 | Guillerm et al. ................. 710/18 |
| 2008/0222703 | A1 * | 9/2008 | Mantani ............................ 726/3 |
| 2009/0201421 | A1 * | 8/2009 | Mawatari et al. .............. 348/553 |
| 2009/0251605 | A1 * | 10/2009 | Hsiao ............................ 348/554 |
| 2010/0121966 | A1 * | 5/2010 | Fujiwara et al. ............... 709/229 |
| 2011/0093593 | A1 * | 4/2011 | Shirakata et al. .............. 709/225 |
| 2012/0008765 | A1 * | 1/2012 | Jackson et al. .................... 380/2 |
| 2012/0027203 | A1 * | 2/2012 | Inada .............................. 380/42 |
| 2012/0203937 | A1 * | 8/2012 | Mohanty et al. ................ 710/16 |
| 2012/0257118 | A1 * | 10/2012 | Aotake et al. ................. 348/725 |

FOREIGN PATENT DOCUMENTS

JP   2010-041091   2/2010

* cited by examiner

*Primary Examiner* — Hung Dang
(74) *Attorney, Agent, or Firm* — Renner, Otto, Boisselle & Sklar, LLP (57) ABSTRACT

A repeater device comprises a determining section for determining whether the authentication with the sink device fails continuously for a predetermined time or more; a repeater information rewriting section for, when the determination is made that the authentication with the sink device has failed continuously for the predetermined time or more, rewriting the repeater information stored in the storage section into information indicating the sink device; and a second authenticating section for causing the source device to obtain the repeater information rewritten into the information indicating the sink device, and causing the source device to authenticate the repeater device.

5 Claims, 5 Drawing Sheets

REPEATER DEVICE

BACKGROUND OF THE INVENTION

1. Field of the Invention

The present invention relates to a repeater device.

2. Description of the Related Art

There is utilized a contents transmitting and receiving system, in which a source device (for example, BD (blu-ray disc) player), a repeater device (for example, an AV receiver), and a sink device (for example, a display device) are connected via an HDMI cable. The BD player reproduces contents recorded in a BD disc, and transmits the contents to the AV receiver. The AV receiver executes an audio process on audio data included in the contents, and outputs audio from a speaker. The AV receiver transmits video data to the display device. The display device executes a video process on the video data supplied from the AV receiver and displays the video data.

The sink device outputs a Receiver Sense signal as a signal indicating whether a TMDS signal of HDMI can be received. When the Receiver Sense is in an ON state, the sink device can receive the TMDS signal, and when the Receiver Sense is in an OFF state, the sink device cannot receive the TMDS signal. Further, when the Receiver Sense is in the OFF state, the sink device generally does not perform HDCP authentication.

Some AV receivers cannot detect the ON/OFF state of the Receiver Sense. In such an AV receiver, when a BD player reproduces a music CD and audio is output from the AV receiver to a speaker, a display device is not necessary. For this reason, the display device is changed from a power ON state into a standby state by a user's operation. As a result, the display device causes the Receiver Sense to transition from ON to OFF with a hot plug signal remaining at a high level. However, since the AV receiver cannot detect the Receiver Sense, the AV receiver repeats output of an HDMI signal and the HDCP authentication with the display device. However, since the display device is in the standby state, the HDCP authentication is not successful. When the HDCP authentication fails between the AV receiver and the display device, the HDCP authentication also fails between the AV receiver and the BD player. As a result, the AV receiver cannot receive HDMI data including music data from the BD player, and the music cannot be reproduced. That is, when the display device is brought into the standby state, no sound is output from the AV receiver.

SUMMARY OF THE INVENTION

An object of the present invention is to provide a repeater device capable of performing authentication with a source device even when the sink device is brought into a standby state in the repeater device that cannot detect a signal indicating whether the sink device can receive contents data.

A repeater device according to the present invention connectable to a source device and a sink device, comprises: a receiving section for receiving contents data from the source device; a transmitting section for transmitting the contents data to the sink device; a storage section for storing repeater information that is obtained by the source device and indicates whether the repeater device is the repeater device or the sink device; a first authenticating section for performing authentication with the sink device; a determining section for determining whether the authentication with the sink device fails continuously for a predetermined time or more; a repeater information rewriting section for, when the determination is made that the authentication with the sink device has failed continuously for the predetermined time or more, rewriting the repeater information stored in the storage section into information indicating the sink device; and a second authenticating section for causing the source device to obtain the repeater information rewritten into the information indicating the sink device, and causing the source device to authenticate the repeater device.

Preferably, after the repeater information rewriting section rewrites the repeater information stored in the storage section into the information indicating the sink device, the first authenticating section performs the authentication with the sink device, when the first authenticating section succeeds in the authentication with the sink device, the repeater information rewriting section rewrites the repeater information stored in the storage section into the information indicating the repeater device, the second authenticating section causes the source device to obtain the repeater information rewritten into the information indicating the repeater device, and causes the source device to authenticate the repeater device.

Preferably, after the second authenticating section once inverts a hot plug signal from the repeater device to the source device into a low level, the second authenticating section again inverts the hot plug signal into a high level, so as to cause the source device to obtain the repeater information.

A repeater device according to the present invention connectable to a source device and a sink device, comprises: a receiving section for receiving contents data from the source device; a transmitting section for transmitting the contents data to the sink device; a storage section for storing repeater information that is obtained by the source device and indicates that the repeater device is the repeater device or the sink device; a first authenticating section for performing authentication with the sink device; a determining section for determining whether the authentication with the sink device fails continuously for a predetermined number of times or more; a repeater information rewriting section for, when the determination is made that the authentication with the sink device has failed continuously for the predetermined number of times or more, rewriting the repeater information stored in the storage section into information indicating the sink device; and a second authenticating section for causing the source device to obtain the repeater information rewritten into the information indicating the sink device, and causing the source device to authenticate the repeater device.

A repeater device according to the present invention connectable to a source device and a sink device, comprises: a receiving section for receiving contents data from the source device; a transmitting section for transmitting the contents data to the sink device; a storage section for storing repeater information that is obtained by the source device and indicates that the repeater device is the repeater device or the sink device; a first authenticating section for performing authentication with the sink device and transmitting information to the sink device; a unit for determining whether a nonacceptance notification is received from the sink device as to the transmission of the information to the sink device; a unit for, when the nonacceptance notification is received from the sink device, causing the transmitting section to once stop the transmission of the contents data, and then causing the transmitting section to start the transmission of the contents data, and causing the first authenticating section to again transmit the information to the sink device; a determining section for determining whether the nonacceptance notification is received from the sink device for a predetermined number of times; a repeater information rewriting section for, when the nonacceptance notification is received from the sink device for the predetermined number of times, rewriting the repeater information stored in the storage section into information indicating the sink device; and a second authenticating section for causing the source device to obtain the repeater information rewritten into the information indicating the sink device, and causing the source device to authenticate the repeater device.

DETAILED DESCRIPTION OF THE PREFERRED EMBODIMENTS

Preferred embodiments of the present invention will be specifically described below with reference to the drawings, but the present invention is not limited to the embodiments. In the embodiments, contents are video (including images, the same applies hereinafter) data and/or audio data.

Figure 1:
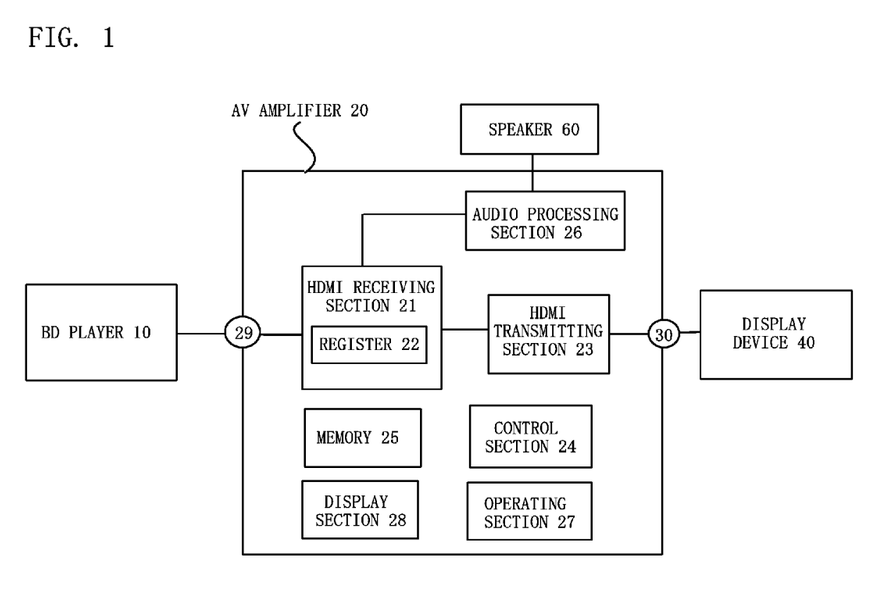
FIG. 1 is a block diagram illustrating a configuration of an AV receiver 20.

As shown in FIG. 1, an input side of an AV receiver (a contents transmitting/receiving apparatus and a repeater device) 20 can be connected to a BD (blu-ray disc) player 10 (a contents transmitting apparatus, a source device). An output side of the AV receiver 20 can be connected to a display device 40 (a contents receiving apparatus, a sink device). The BD player 10, the AV receiver 20, and the display device 40 comply with, for example, HDMI standards, and they are connected with each other via an HDMI cable. The BD player 10 reproduces video data and audio data from a disc and converts them into HDMI data so as to supply the HDMI data to the AV receiver 20.

The AV receiver 20 substantially has an HDMI receiving section 21, a register 22, an HDMI transmitting section 23, a control section 24, a memory (ROM, RAM, and the like) 25, an audio processing section 26, an operating section 27, a display section 28, an HDMI input terminal 29, and an HDMI output terminal 30. The control section 24 controls respective sections of the AV receiver 20 based on operating programs of the AV receiver stored in the memory 25, and is for example, a microcomputer or a CPU.

The HDMI receiving section 21 receives HDMI data from the BD player 10 via the HDMI input terminal 29, and generates the original video data based on the received HDMI data so as to supply the original video data to the HDMI transmitting section 23. The HDMI receiving section 21 generates original audio data based on the received HDMI data so as to supply the original audio data to the audio processing section 26.

The HDMI receiving section 21 has the register (storage element) 22, and authentication information and repeater bit (repeater information) of the AV receiver 20 are registered in the register 22. In the HDCP authentication, the authentication information and the repeater bit registered in the register 22 are read by the HDMI transmitting section of the BD player 10. The repeater bit is device information indicating whether the device is the repeater device (namely, the device that can transmit the HDMI data to another device) or the sink device (namely, the device that cannot transmit the HDMI data to another device). When a value of the repeater bit is "1", this indicates that the device is the repeater device, and when the value is "0", this indicates that the device is the sink device.

The HDMI transmitting section 23 converts the video data supplied from the HDMI receiving section 21 into the HDMI data. The HDMI transmitting section 23 transmits the HDMI data to the display device 40 via the HDMI output terminal 30.

The audio processing section 26 executes audio processes, such as a signal process, a delay process, an equalizer process, a volume adjusting process, an amplifying process, and DA conversion, on the audio data supplied from the HDMI receiving section 21, and supplies the audio signal to a speaker 60 connected to the outside. The operating section 27 accepts user's operations, and may be operation buttons and/or a remote control transmitter receiver provided to a casing of the AV receiver 20. The display section 28 is an LCD, an FL tube, or the like.

The HDMI transmitting section 23 according to this embodiment cannot detect a Receiver Sense supplied from the display device 40 via, for example, a TMDS line of HDMI. Therefore, when the display device 40 is brought into a standby state, the control section 24 cannot determine that the display device 40 cannot receive a TMDS signal of an HDMI signal based on the Receiver Sense.

In this embodiment, the control section 24 determines whether the AV receiver 20 fails in HDCP authentication with the display device 40 continuously for a predetermined time (for example, 3 second) or more (alternatively, the control section 24 may determine whether the AV receiver 20 fails in the HDCP authentication with the display device 40 continuously for a predetermined number of times or more). When the determination is made that the HDCP authentication with the display device 40 fails continuously for the predetermined time or more, the control section 24 estimates that the Receiver Sense from the display device 40 has transitioned from ON to OFF. Therefore, the control section 24 rewrites the repeater bit stored in the register 22 into "0" indicating the sink device. The control section 24 then causes the HDMI transmitting section of the BD player 10 to obtain the repeater bit rewritten into "0", and causes the BD player 10 to perform the HDCP authentication with the AV receiver 20.

When the repeater bit is "1" indicating the repeater device, if the HDCP authentication between the AV receiver 20 and the display device 40 is not successful, the HDCP authentication between the BD player 10 and the AV receiver 20 is not successful. Therefore, when the display device 40 is in the standby state, the HDCP authentication between the BD player 10 and the AV receiver 20 is not successful. However, when the repeater bit is rewritten into "0" indicating the sink device, the authentication between the BD player 10 and the AV receiver 20 can be performed regardless of the state of the display device 40. Therefore, even when the display device 40 is in the standby state, the authentication between the BD player 10 and the AV receiver 20 can be performed.

Figure 2:
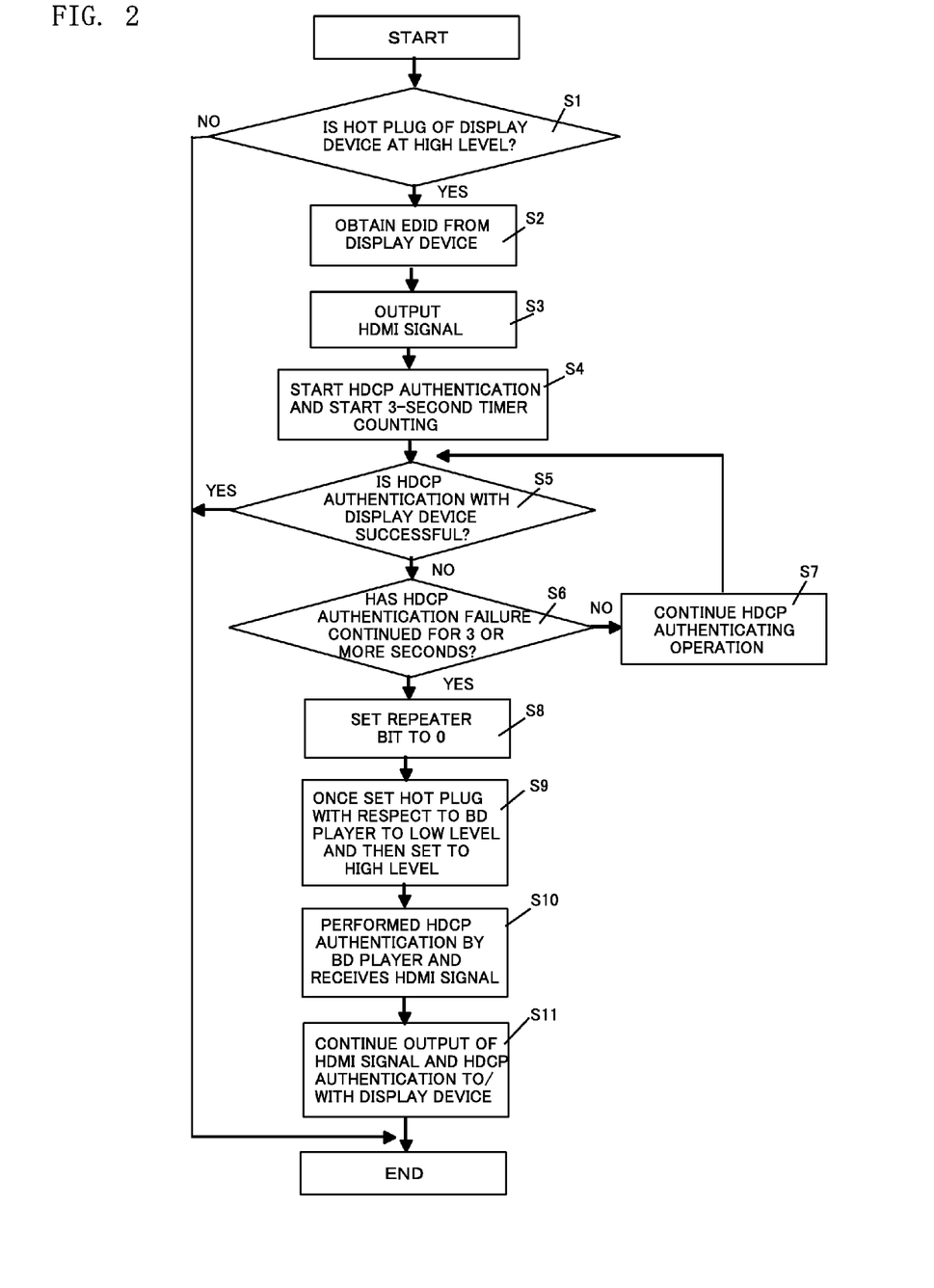
FIG. 2 is a flowchart illustrating an operation of the AV receiver 20.

An operation according to this embodiment will be described below. As shown in FIG. 2, the control section 24 determines whether a hot plug signal from the display device 40 is at a high level (S1). When the hot plug signal is at a low level (NO in S1), the process is ended. When the hot plug signal is at the high level (YES in S1), the control section 24 obtains EDID information from the display device 40 (S2), and causes the HDMI transmitting section 23 to output the HDMI signal to the display device 40 (S3).

The control section 24 causes the HDMI transmitting section 23 to start the HDCP authentication with the HDMI receiving section of the display device 40, and carries out timer counting for a predetermined time (for example, 3 seconds) (S4). Specifically, authentication information is read from the register of the display device 40, and when the authentication information is valid, the HDCP authentication is successful. When the authentication information is invalid or the authentication information cannot be read, the HDCP authentication fails. The authentication information includes KSV (key select vector) or the like determined by the HDCP standards.

The control section 24 determines whether the HDCP authentication with the display device 40 is successful (S5). When determined as successful (YES in S5), the process is ended. When determined as unsuccessful (NO in S5), the control section determines whether the HDCP authentication has failed continuously for a predetermined time or more (3 seconds) (S6). When NO in S6, the HDCP authentication is continued (S7), and the process returns to S5. When YES in S6, the control section 24 rewrites the repeater bit registered in the register 22 into "0" indicating the sink device (S8). That is, the control section 24 causes the BD player 10 to recognize that the AV receiver 20 is not the repeater device but the sink device.

The control section 24 once inverts the hot plug signal, which is output from the AV receiver 20 to the BD player 10, from a high level into a low level, and then inverts the hot plug signal into the high level again (S9). In this manner, a connection between the AV receiver 20 and the BD player 10 is once released, and the BD player 10 is caused to obtain the repeater bit again.

When the BD player 10 detects that the hot plug signal is inverted from the low level into the high level, the BD player 10 obtains the repeater bit from the AV receiver 20 so as to recognize that the AV receiver 20 is the sink device. Therefore, even when the display device 40 is in the standby state, the authentication between the BD player 10 and the AV receiver 20 can be performed (S10). The BD player 10 transmits the HDMI data including music data to the AV receiver 20, and the AV receiver 20 can reproduce the music data from the received HDMI data.

When the display device 40 is changed from a power ON state into the standby state by the above process, and the AV receiver 20 fails in the HDCP authentication with the display device 40 continuously for the predetermined time or more, the Receiver Sense from the display device 40 is estimated to transition from ON to OFF, and the AV receiver 20 rewrites the repeater bit into "0" indicating the sink device. Therefore, even when the display device 40 is in the standby state, the authentication between the BD player 10 and the AV receiver 20 can be performed.

Even after the repeater bit is rewritten into "0" indicating the sink device, the control section 24 causes the HDMI transmitting section 23 to transmit an HDMI signal to the display device 40 and perform the HDCP authentication with the display device 40 (S11). This is because when the display device 40 is changed from the standby state into the power ON state again, the control section 24 rewrites the repeater bit of the AV receiver 20 into "1" indicating the repeater device, and causes the AV receiver 20 to operate as the repeater device.

Figure 3:
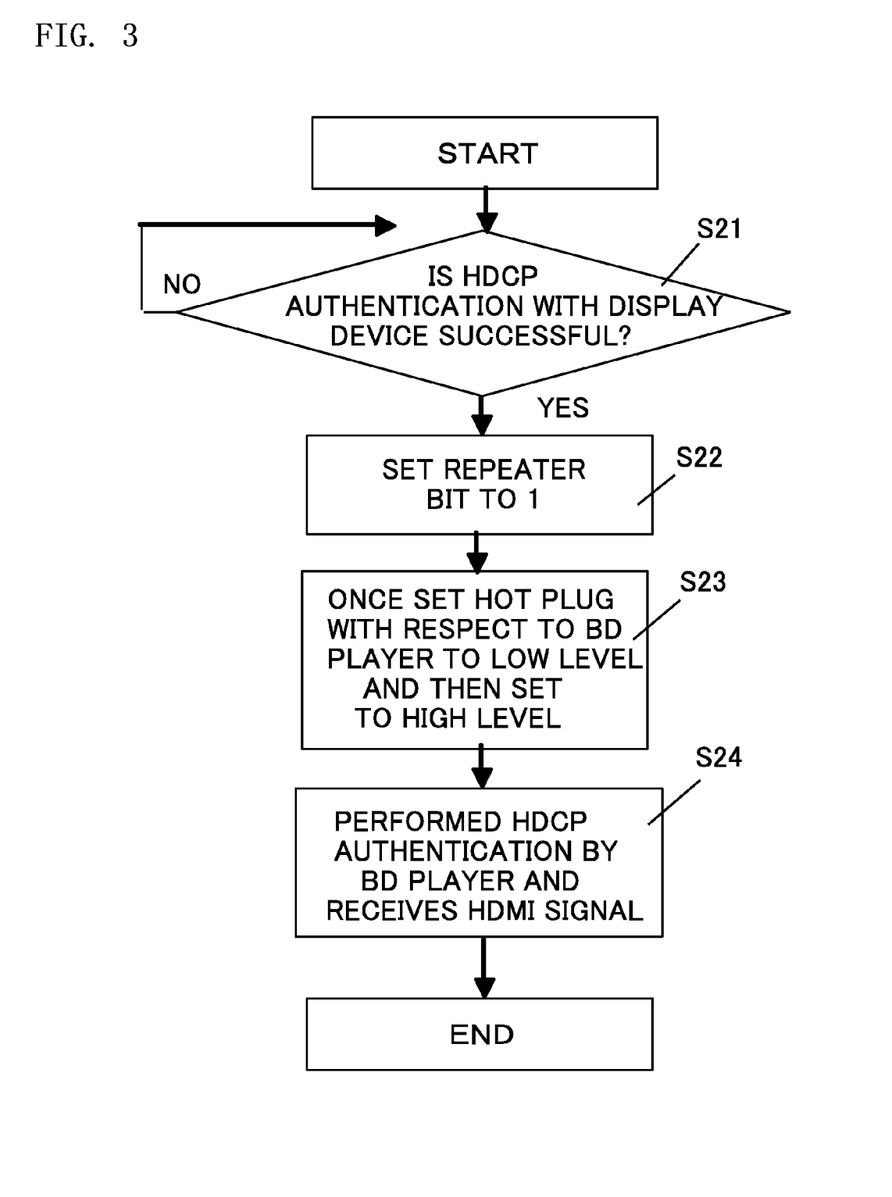
FIG. 3 is a flowchart illustrating the operation of the AV receiver 20.

That is, as shown in FIG. 3, after the repeater bit is rewritten into "0" indicating the sink device, the control section 24 determines whether the HDCP authentication with the display device 40 is successful (S21). When determined as successful (YES in S21), the control section 24 rewrites the repeater bit registered in the register 22 into "1" indicating the repeater device (S22). That is, the control section 24 causes the BD player 10 to recognize that the AV receiver 20 is not the sink device but the repeater device.

The control section 24 once inverts the hot plug signal, which is output from the AV receiver 20 to the BD player 10, from the high level into the low level, and then inverts the hot plug signal to the high level again (S23). In this manner, the connection between the AV receiver 20 and the BD player 10 is once released, and the BD player 10 is caused to obtain the repeater bit again.

When the BD player 10 detects that the hot plug signal is inverted from the low level into the high level, the BD player 10 obtains the repeater bit from the AV receiver 20, and recognizes that the AV receiver 20 is the repeater device. At this time, since the HDCP authentication between the display device 40 and the AV receiver 20 is successful, even when the repeater bit is "1", the authentication between the BD player 10 and the AV receiver 20 can be performed (S24). The BD player 10 transmits the HDMI data including video data and audio data to the AV receiver 20, and the AV receiver 20 obtains the audio data from the received HDMI data and reproduces the audio data, so as to transmit the HDMI data including the video data to the display device.

When the HDCP authentication with the display device 40 is enabled, the AV receiver 20 can be operated as the repeater device as originally intended.

Figure 4:
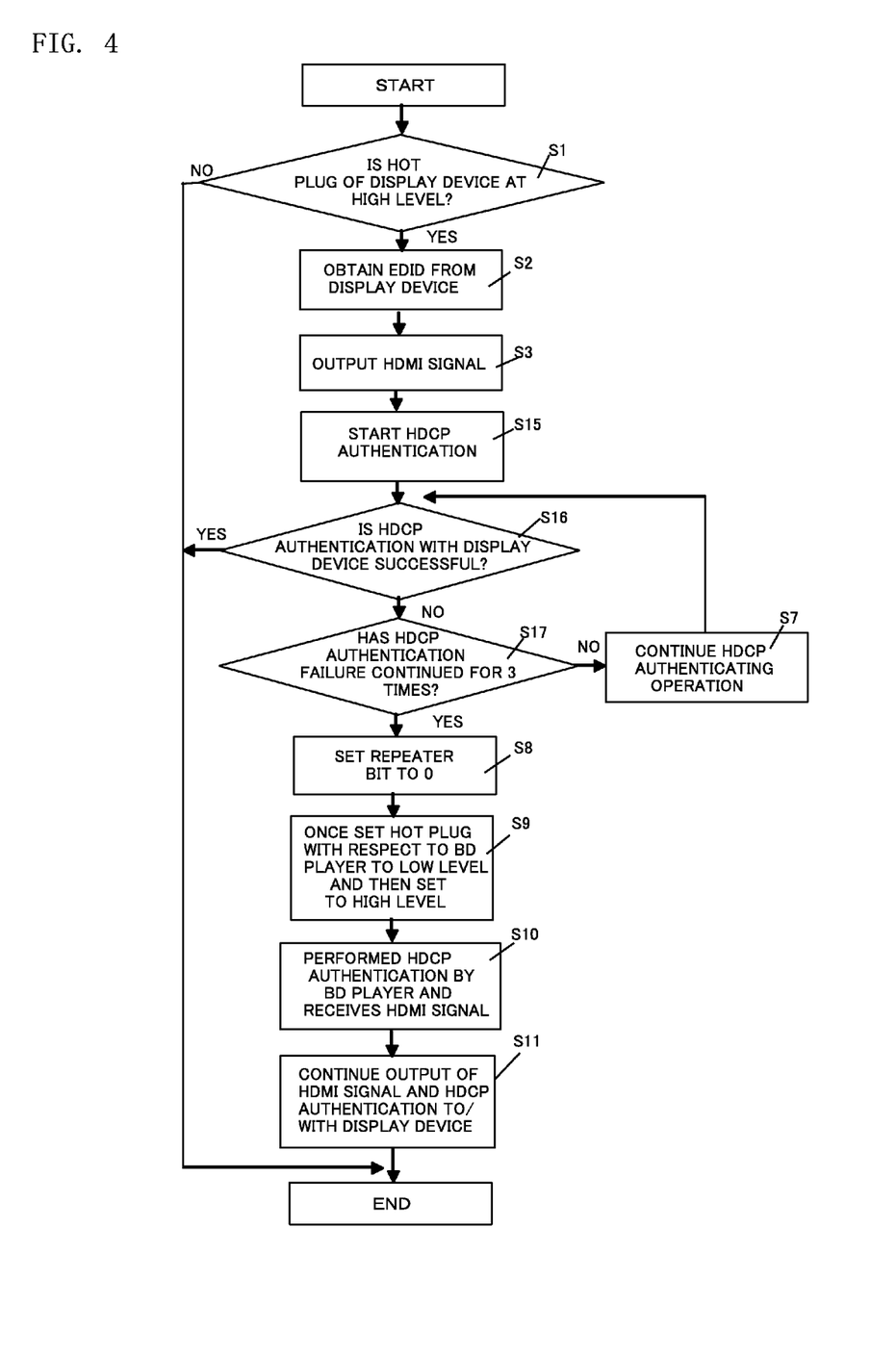
FIG. 4 is a flowchart illustrating the operation of the AV receiver 20.

Another preferred embodiment of the present invention will be described below. FIG. 4 is a flowchart illustrating a process of this example, and the same processes as those in FIG. 2 are denoted by the same reference symbols, and the description thereof is omitted. The control section 24 causes the HDMI transmitting section 23 to start the HDCP authentication with the HDMI receiving section of the display device 40 (S15). The control section 24 determines whether the HDCP authentication with the display device 40 is successful (S16). When determined as successful (YES in S16), the process is ended. When determined as unsuccessful (NO in S16), the control section 24 determines whether the HDCP authentication has been unsuccessful continuously for a predetermined number of times (for example, three times) or more (S17). When NO in S17, the HDCP authentication is continued (S7), and the process returns to S16. When YES in S17, the process goes to S8.

Figure 5:
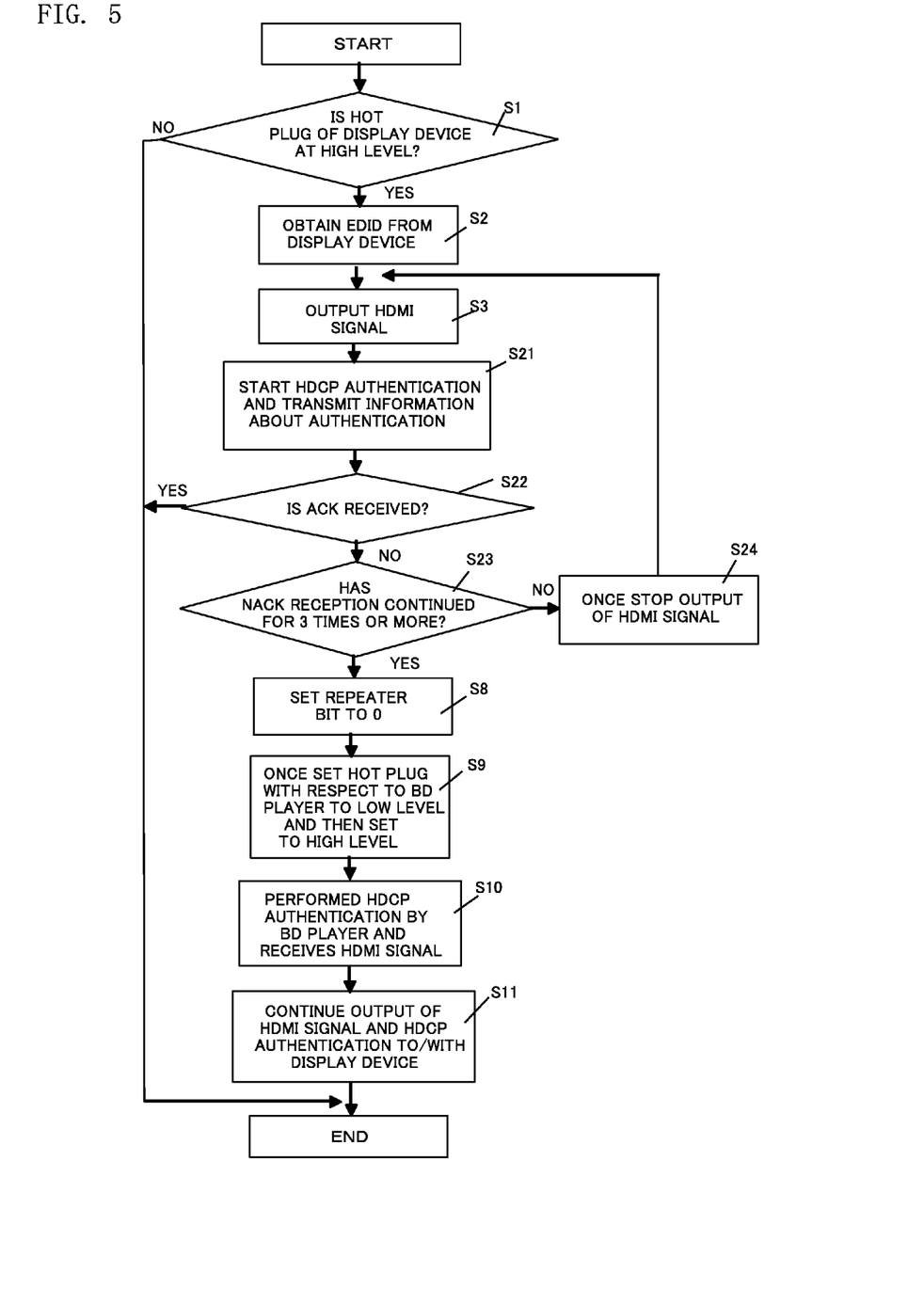
FIG. 5 is a flowchart illustrating the operation of the AV receiver 20.

Next, still another preferred embodiment of the present invention will be described below. FIG. 5 is a flowchart illustrating a process of this example, and the same processes as those in FIG. 2 are denoted by the same reference symbols, and the description thereof is omitted. After S3, the control section 24 causes the HDMI transmitting section 23 to start the HDCP authentication with the HDMI receiving section of the display device 40, and transmits information necessary for the authentication to the HDMI receiving section of the display device 40 via a DDC line (S21). This information includes address information (0X74) of the register, and actual notification contents following after the address information. When the HDMI receiving section of the display device 40 accepts the information, it transmits ACK (reception notification) to the HDMI transmitting section 23 of the AV receiver 20. When the HDMI receiving section does not accept the information, it transmits NACK (nonacceptance notification) to the HDMI transmitting section 23 of the AV receiver 20.

The control section 24 determines whether the HDMI transmitting section 23 receives ACK from the HDMI receiving section of the display device 40 (S22). When the HDMI transmitting section 23 receives ACK (YES in S22), the process is ended. On the other hand, when the HDMI transmitting section 23 receives not ACK but NACK (NO in S24), the control section 24 determines whether the HDMI transmitting section 23 has received NACK from the HDMI receiving section of the display device 40 continuously for a predetermined number of times (for example, three times) or more (S23). When the HDMI transmitting section 23 has not received NACK for the predetermined number of times or more (NO in S23), the control section 24 causes the HDMI transmitting section 23 to once stop output of the HDMI signal (S24), and then returns to S3 so as to cause the HDMI transmitting section 23 to start the output of the HDMI signal and to again execute the transmission of the information (S21). When the HDMI transmitting section 23 receives NACK continuously for the predetermined number of times or more in S23 (YES in S23), the process goes to S8. The process after S8 is as described in FIG. 2. By once stopping the output of the HDMI signal and again starting the output of the HDMI signal, even if the HDMI receiving section of the display device 40 does not accept the information due to an influence of a noise of the HDMI signal or the like, the information may be accepted the next time.

The preferred embodiments of the present invention have been described above, but the present invention is not limited to these embodiments. The present invention may be provided in forms of a program for causing the AV receiver to perform the above operation and a recording medium that records the program.

What is claimed is:

1. A repeater device connectable to a source device and a sink device, comprising:
    a receiving section for receiving contents data from the source device;
    a transmitting section for transmitting the contents data to the sink device;
    a storage section for storing repeater information that is obtained by the source device and indicates whether the repeater device is the repeater device or the sink device;
    a first authenticating section for performing authentication with the sink device;
    a determining section for determining whether the authentication with the sink device fails continuously for a predetermined time or more;
    a repeater information rewriting section for, when the determination is made that the authentication with the sink device has failed continuously for the predetermined time or more, rewriting the repeater information stored in the storage section into information indicating the sink device; and
    a second authenticating section for causing the source device to obtain the repeater information rewritten into the information indicating the sink device, and causing the source device to authenticate the repeater device.

2. The repeater device according to claim 1, wherein
    after the repeater information rewriting section rewrites the repeater information stored in the storage section into the information indicating the sink device, the first authenticating section performs the authentication with the sink device,
    when the first authenticating section succeeds in the authentication with the sink device, the repeater information rewriting section rewrites the repeater information stored in the storage section into the information indicating the repeater device,
    the second authenticating section causes the source device to obtain the repeater information rewritten into the information indicating the repeater device, and causes the source device to authenticate the repeater device.

3. The repeater device according to claim 1, wherein after the second authenticating section once inverts a hot plug signal from the repeater device to the source device into a low level, the second authenticating section again inverts the hot plug signal into a high level, so as to cause the source device to obtain the repeater information.

4. A repeater device connectable to a source device and a sink device, comprising:
    a receiving section for receiving contents data from the source device;
    a transmitting section for transmitting the contents data to the sink device;
    a storage section for storing repeater information that is obtained by the source device and indicates that the repeater device is the repeater device or the sink device;
    a first authenticating section for performing authentication with the sink device;
    a determining section for determining whether the authentication with the sink device fails continuously for a predetermined number of times or more;
    a repeater information rewriting section for, when the determination is made that the authentication with the sink device has failed continuously for the predetermined number of times or more, rewriting the repeater information stored in the storage section into information indicating the sink device; and
    a second authenticating section for causing the source device to obtain the repeater information rewritten into the information indicating the sink device, and causing the source device to authenticate the repeater device.

5. A repeater device connectable to a source device and a sink device, comprising:
    a receiving section for receiving contents data from the source device;
    a transmitting section for transmitting the contents data to the sink device;
    a storage section for storing repeater information that is obtained by the source device and indicates that the repeater device is the repeater device or the sink device;
    a first authenticating section for performing authentication with the sink device and transmitting information to the sink device;
    a unit for determining whether a nonacceptance notification is received from the sink device as to the transmission of the information to the sink device;
    a unit for, when the nonacceptance notification is received from the sink device, causing the transmitting section to once stop the transmission of the contents data, and then causing the transmitting section to start the transmission of the contents data, and causing the first authenticating section to again transmit the information to the sink device;
    a determining section for determining whether the nonacceptance notification is received from the sink device for a predetermined number of times;
    a repeater information rewriting section for, when the nonacceptance notification is received from the sink device for the predetermined number of times, rewriting the repeater information stored in the storage section into information indicating the sink device; and
    a second authenticating section for causing the source device to obtain the repeater information rewritten into the information indicating the sink device, and causing the source device to authenticate the repeater device.

* * * * *